July 15, 1958  G. B. AMERY  2,842,849
PLOTTING SUBSURFACE SEISMIC REFLECTING BOUNDARIES
Filed Aug. 22, 1955  2 Sheets-Sheet 1

$T_2 - T_1 = \Delta T$

INVENTOR.
George B. Amery,
BY
Frank S. Troidl
ATTORNEY.

July 15, 1958 G. B. AMERY 2,842,849
PLOTTING SUBSURFACE SEISMIC REFLECTING BOUNDARIES
Filed Aug. 22, 1955 2 Sheets-Sheet 2

INVENTOR.
George B. Amery,
BY
Frank S. Troidl
ATTORNEY.

United States Patent Office 2,842,849
Patented July 15, 1958

2,842,849

PLOTTING SUBSURFACE SEISMIC REFLECTING BOUNDARIES

George B. Amery, Houston, Tex.

Application August 22, 1955, Serial No. 529,702

3 Claims. (Cl. 33—79)

This invention relates to a novel method of plotting subsurface seismic reflecting formations.

The process of plotting the actual location of a subsurface seismic reflecting boundary is performed by a highly skilled seismic computer. The seismic computer obtains seismic records from the seismic crew and from these records plots a profile of reflecting subsurface boundaries. Usually the computer plots the subsurface profile as though the reflecting boundaries are located directly below the shot point of the seismic spread from which each particular seismic record is obtained. If the reflecting boundary has no dip the plotted boundary is located in its proper position; however, if the subsurface boundary is dipping the actual subsurface boundary from which the recorded seismic waves were reflected, will not be plotted in its proper position. This is so because the actual reflecting subsurface is offset from the shot point. Hence, the actual reflecting subsurface is located in a different position and has a different dip or slope from that of the plotted subsurface boundary.

The seismic computer may, if he desires to do so, plot the actual reflecting subsurface from data obtained from a seismogram. However, complicated calculations were formerly required to be performed to accurately locate on the profile the reflecting subsurface. The computer, therefore, normally plots the subsurface, even when there is a large dip, as though the reflecting boundary were located directly below the shot point because by so doing he can plot the reflecting boundary directly on a time-distance chart without the necessity of performing complicated and time consuming calculations. The computer must subsequently transpose the plotted boundaries to another chart and locate the actual position of the boundaries.

Previous to the development of my new method the procedure has been to place a wave-front chart on a light table, superimpose a thin drawing paper over the wave-front chart and properly position the reflected boundary on the drawing paper by reference to the chart. The resultant cross-section or profile was necessarily on flimsy paper and preparation of the section was tedious and time consuming since it had to be re-positioned over the wave-front chart for each location. The wave-front chart is a chart which has drawn thereon a group of lines which represent successive positions of the seismic wave front with time. The locations of the wave front are determined by the expected velocity of the seismic waves in the medium in the vicinity where the seismograms were taken.

My new method which is illustrated by one type of apparatus suitable for performing the method, which apparatus is simple in construction, is a new method of plotting the actual reflecting subsurface directly or of plotting an actual position of a reflecting subsurface from a previously plotted apparent reflecting subsurface. Other instruments have been devised for plotting subsurface boundaries. Two such instruments are illustrated by the patent to Knauth et al. 2,460,642 issued February 1, 1949, and Anderson 2,217,720 issued October 15, 1940. Instruments such as those of the patents to Knauth et al. and Anderson, however, do not utilize a wave-front chart but rather utilize a depth indicating means which is calibrated as though the velocity of the seismic waves through the medium is constant. These instruments also require that the seismic computer make calculations to determine the $\Delta\ t$. The $\Delta\ t$ is defined as the time it takes a seismic wave to impinge upon a seismometer minus the time it takes the seismic wave to impinge upon a second seismometer spaced on the opposite side of, and equidistant from, the shot point. Actually, the velocity of a seismic wave is not constant throughout the medium. In general, it has been found that the velocity of a seismic wave through a medium increases linearly with depth according to the equation: $V = V_1 + aZ$ where $V_1$ is the original velocity of the seismic wave and $Z$ is the depth, and $a$ is a constant of proportionality that varies with the area in which measurements are made. However, in certain areas the velocity may increase with depth according to a different equation. Therefore, plotting instruments which utilize a depth indicator for locating the subsurface boundaries assuming a constant velocity have the disadvantage of not only requiring calculations but also do not accurately locate the subsurface boundary. The use of a wave-front chart, however, permits the skilled seismic computer to construct a wave-front chart which represents the successive positions of the wave fronts in a particular medium by utilizing a particular velocity formula. The manner in which the velocity changes with depth may be estimated by conventional velocity surveying instruments such as a velocity logger. This wave-front chart will be constructed to include changes in velocity due to depth and when once constructed, the chart can be used to plot the actual position of the reflecting surface.

Briefly described my new method of plotting subsurface seismic reflecting boundaries consists of placing a wave-front chart adjacent the plotting paper, which plotting paper has a horizontal scale representing the distance from a reference point and a vertical scale representing reflection travel time from shot point to the reflecting boundary and back to the recording seismometer at the ends of the profile, and drawing a line on the second sheet along points on said second sheet representing the correct location of the reflecting boundary.

Other objects and a fuller understanding of the invention may be had by reference to the following description and claims, taken in conjunction with the accompanying drawings in which:

Figure 2:
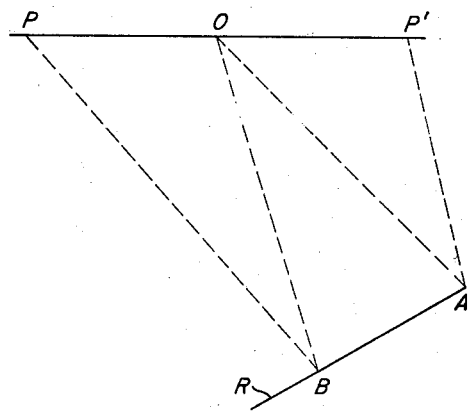
Fig. 2 shows the position of the actual reflecting subsurface from which the subsurface of Fig. 1 was plotted.

Referring to the drawings and particularly to Fig. 2, let R designate a line showing the actual position of a reflecting subsurface. Further let us assume a shot point is located at O and a seismometer is located at P and another seismometer located at P' with the distance OP equalling OP'. Seismic waves emanating from point O will impinge upon the reflecting subsurface R and be detected by detectors P and P'. Some waves emanating from shot point O will impinge upon the reflecting surface R at point B and then reflect back to point P where they are detected. Other seismic waves emanating from point O will impinge upon the reflecting surface R at point A and be reflected back to point P'. It can be clearly seen that the length $OB+BP$ is greater than the length $OA+AP'$. Therefore, length $OBP$ − length $OAP'$ is proportional to $\Delta t$.

Figure 3:
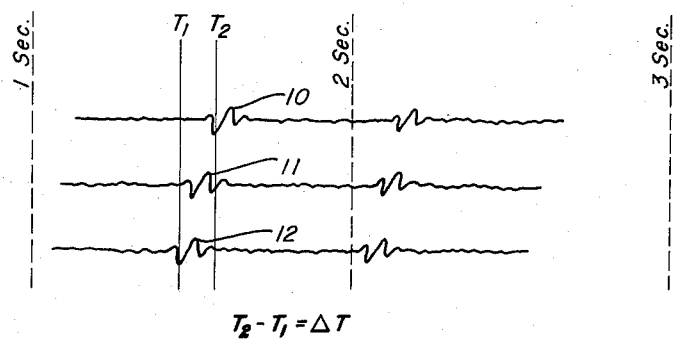
Fig. 3 is a portion of a seismogram from which the data utilized in plotting the line of Fig. 1 was obtained.

A seismic record obtained from the reflecting subsurface shown at Fig. 2 is shown in Fig. 3. For the purposes of clarity the usual multitude of wiggles is excluded from Fig. 3; the only wiggles shown are those at 10, 11, and 12 which represent the impingement of the seismic waves at points P, O and P', respectively, of Fig. 2. In Fig. 3 time increases from left to right. The $\Delta t$ between wiggle 10 and wiggle 12 is: $\Delta t = T_2 - T_1$ where $T_2$ is the time required for the seismic waves to impinge seismometer P and $T_1$ the time required for the seismic waves to impringe upon seismometer P'.

Figure 1:
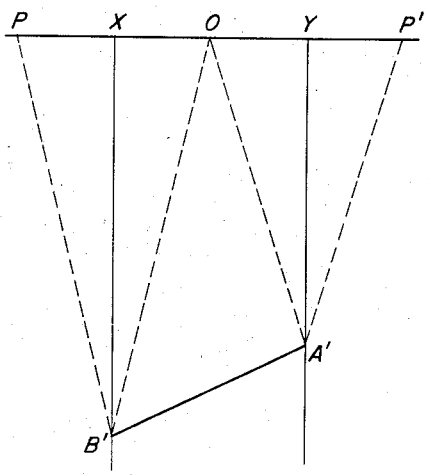
Fig. 1 is a graph showing the position of a plotted reflecting subsurface.

A skilled seismic computer reads a seismogram such as that shown in Fig. 3 and plots the reflecting subsurface R as though it were located directly below the shot point O. He does this by plotting times $T_1$ and $T_2$ below points midway between the shot point and seismometers P' and P, respectively, as shown in Fig. 1. It can be clearly seen from an examination of Figs. 1 and 2 that the plotted line B'A' is not located in its true position relative to the shot point O and it does not have the same slope as the true reflecting subsurface R. Hence, the lines which are plotted in Fig. 1 must be transposed to their correct position.

Figure 6:
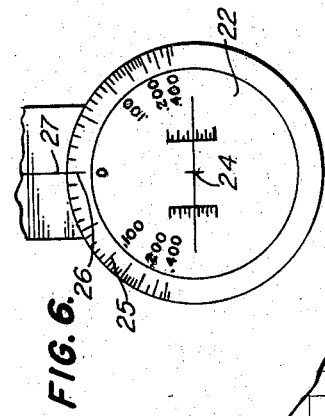
Fig. 6 is an enlarged view of the indexing or tangent indicating means 24 shown in Fig. 4.
Figure 4:
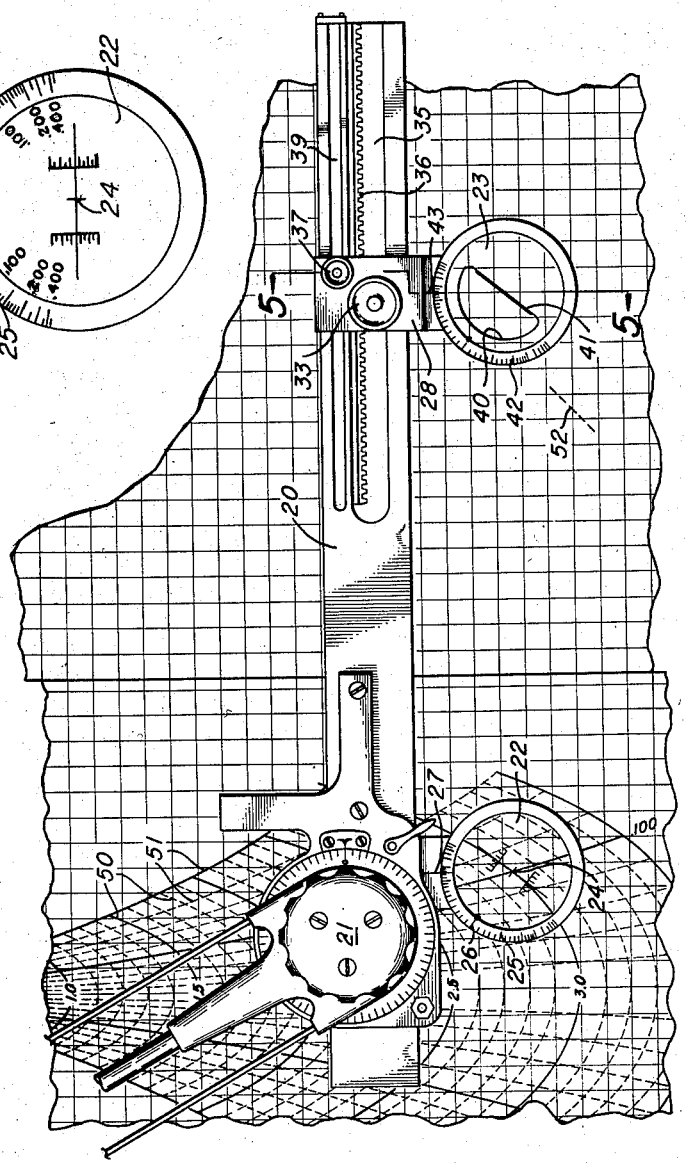
Fig. 4 shows one type instrument which may be utilized in carrying out my new method.

The transposition of the plotted subsurface to its actual position may be accomplished by the utilization of an instrument such as shown in Fig. 4. As shown in Fig. 4 a ruler 20 is attached to a conventional drafting machine 21. Attached to the ruler 20 is a first transparent disc 22 and a second transparent disc 23. Located on the first transparent disc 22 is an indexing or tangent indicating means 24 including a straight line with two sets of transverse graduations and a slope indicating means 25. The indexing means 24, which is most perspicuously shown in Fig. 6, is preferably located through the center of the axis of transparent disc 22. The slope indicating means 25 consists of indications of the slope about the periphery of the transparent disc 22. The graduations on the slope indicating means 25 increase both to the left and to the right of a zero mark 26. An indexing means 27 is also connected to the ruler 20 with said indexing means 27 serving to index the graduations around the periphery of transparent disc 22.

Figure 5:
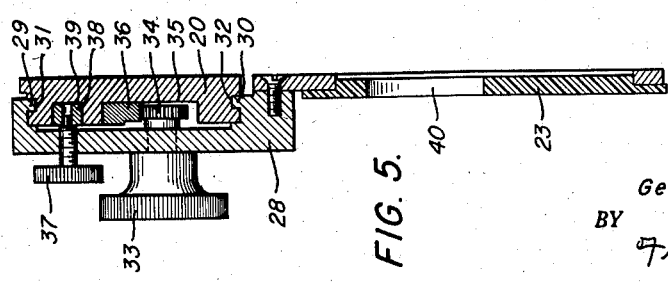
Fig. 5 is a view taken along lines 5—5 of Fig. 4.

Transparent disc 23 is movably connected to the ruler 20 by means of a rider member 28. The rider member 28 has dove tail portions 29 and 30 which slide along grooves 31 and 32 formed within the ruler 20 (as shown in Fig. 5). Associated with the rider member 28 is a rider member adjustment screw 33 which has attached to its inner end a gear 34. Gear 34 fits into a groove 35 in ruler member 20 and meshes with a rachet 36. It can be seen, therefore, that rotation of adjustment member 33 causes the movement of transparent disc 23 longitudinally along the ruler 20. In order to lock the rider member 28 in position there is provided a lock screw 37 which presses against a pressure pad 38. Pressure pad 38 slides along a second groove 39 cut into ruler 20. Locking of the rider member 28 is accomplished simply by turning lock screw 37 and exerting pressure against pressure pad 38.

The transparent disc 23 has a cut-out portion 40 and a straight edge portion 41 passing through the axis of the disc 23. Transparent disc 23 also has a slope indicating means 42. The rider member 28 has an index line 43 serving to index the graduations on disc 23. The slope graduations to the right of the zero mark indicate a reflecting subsurface which dips toward the left and the slope graduations to the left of the zero mark indicate a reflecting subsurface formation which dips to the right (looking at Fig. 4).

In practicing my new method of plotting subsurface seismic reflecting boundaries a wave-front chart is utilized which is not transparent. The wave-front chart is mounted on a rigid and heavy mount to provide rigidity when the wave-front chart is utilized on a drafting board. A suitable mounting might be made of stainless steel. The wave-front chart has a series of curves representative of the seismic wave at successive times after the emanation of said seismic wave from a shot point. These wave-front lines are indicated by the numeral 50. The wave-front chart also has a second series of curves representative of the $\Delta t$ of a reflecting subsurface boundary indicated by numeral 51. It can be seen that lines 50 and 51 intersect one another.

The mounted wave-front chart is placed adjacent a sheet upon which the apparent reflecting surface 52 has been plotted. The left hand disc 22 is first positioned at the intersection of the zero $\Delta t$ line and the time of reflection line by positioning line 24 tangent to the time of reflection line at this point. In Fig. 4 this time of reflection is three seconds. The rider 28 is then positioned so that the center of the right hand disc 23 is on the middle of the plotted line 52. Reflecting surface line 52 is a fragment of a much longer line derived by seismogram interpretations in the usual manner, only a fragment being shown due to space limitations and to avoid undue confusion in the drawing. The straight edge 41 of transparent disc 23 is then rotated until it is parallel to line 52. The $\Delta t$ of plotted line 52 is then read from the slope graduations on indexing means 43. Indexing means 24 is then moved along the proper wave front (three second wave front) to the $\Delta t$ line 51 on the wave front chart. This moved position is shown in Fig. 4 where the $\Delta t$ is .100. The slope and direction of slope of the actual wave front may then be read by means of scale 25 and index 27. The right hand disc 23 is then rotated to set the same slope as read from transparent disc 22 into the transparent disc 23. The actual position of the reflecting boundary is then marked along straight edge 41. The rider member 28 may then be unlocked and moved longitudinally along ruler 20 preparatory to the plotting of an adjacent subsurface reflecting boundary.

My new method may also be utilized to plot the reflecting boundary directly. When the reflecting boundary is plotted directly, the time and the $\Delta t$ data are obtained from the seismic record such as shown in Fig. 3. Disc 22 may then be located directly over the intersection of the proper time line and $\Delta t$ line of the wave front chart and the slope of the actual reflecting subsurface obtained from transparent disc 22. This slope is then placed into transparent disc 23 and the reflecting subsurface plotted.

Hence, my new method has the advantages over previous methods of permitting the use of normal weight paper for cross sections and eliminates the need for a light table. It further allows rapid transmittal of all reflections or a zone of reflections without requiring a repositioning of a chart for each location. It is simple in operation and can be performed speedily and does not involve any complicated calculations by the seismic computer using this method.

I claim:

1. A method of moving a reflecting subsurface from its plotted apparent position to its actual position including the steps of: placing a wave-front chart adjacent the chart upon which the apparent position has been plotted, said wave-front chart having a series of curves representative of the seismic wave at particular times after the emanation of said seismic wave from a shot point, and a second series of curves representative of the $\Delta t$ of the subsurface reflecting boundary, said first series and said second series intersecting one another; placing a member having an indexing means and slope indicating means on said wave-front chart with the indexing means at the intersection of the curve representing the travel time to the reflecting boundary with the zero Δt line; placing a straight edge of a second member having a slope indicating means along said plotted apparent position whereby the slope of said apparent position is indicated from the slope indicating means of said second member; moving said indexing means on said first member along the curve representing the travel time to the reflecting boundary to the intersection of the travel time curve and the Δt line representing the same slope as the slope obtained from said second member while simultaneously moving said second member whereby the slope of the actual reflecting surface is indicated from the slope indicating means on said first member; setting the straight edge of the second member to the slope of the actual reflecting surface; and drawing a line representing said actual reflecting surface.

2. In combination: a seismic wave-front chart mounted on a rigid support, said wave-front chart depicting the instantaneous position of an artificial seismic wave in the earth's surface with respect to a ground surface position from which the wave was initiated; a drafting machine mounted on said rigid support for transporting a pivot support member across the surface of said wave-front chart with two degrees of freedom of movement and without rotating said pivot support; a ruler pivotally mounted on said pivot support means; a first rotatable transparent disk mounted on said ruler, said transparent disk having indexing means in the center thereof and slope indicating means on the periphery thereof; a second rotatable transparent disk slidably mounted on said ruler; said second transparent disk having a straight-edge cut therein and slope indicating means on the periphery thereof.

3. In combination. a seismic wave-front chart mounted on a rigid support, said wave-front chart depicting the instantaneous position of an artificial seismic wave in the earth's surface with respect to a ground surface position from which the wave was initiated; a drafting machine mounted on said rigid support for transporting a pivot supporting member across the surface of said wave-front chart with two degrees of freedom of movement and without rotating said pivot support; a ruler pivotally mounted on said pivot support means; a first rotatable transparent disk mounted on said ruler, said transparent disk having indexing means in the center thereof and slope indicating means on the periphery thereof; a second rotatable transparent disk slidably mounted on said ruler; said second transparent disk having a straight-edge cut therein and slope indicating means on the periphery thereof; and manually actuatable locking means for locking said second disk to said ruler and for locking said ruler to said pivot support means.

References Cited in the file of this patent

UNITED STATES PATENTS 2,535,220    McGuckin _____ Dec. 26, 1950

FOREIGN PATENTS 126,214    Australia _____ Dec. 9, 1947

OTHER REFERENCES

Geophysical Exploration, C. A. Heiland, New York, Prentice Hall, Inc. 1946, page 565.

An Instrument for Plotting Reflection Data, Geophysics, volume XIII, No. 2, April, 1948, John W. Daly, pages 155–157, Society of Exploration Geophysicists.

Exploration Geophysics, second edition, J. J. Jakosky, Trija Publishing Company, Los Angeles, 1940 and 1950 page 747–749.